United States Patent [19]

Baughman

[11] Patent Number: 5,069,377
[45] Date of Patent: Dec. 3, 1991

[54] ROOF RACK FOR VEHICLES

[76] Inventor: Alton Baughman, 4710 Burtch Rd., North Street, Mich. 48049

[21] Appl. No.: 625,084

[22] Filed: Dec. 10, 1990

[51] Int. Cl.$^5$ .................................................. B60R 9/00
[52] U.S. Cl. .................................... 224/326; 224/321; 410/101
[58] Field of Search ............... 224/326, 321, 325, 309; 410/96, 101, 97, 98

[56] References Cited

U.S. PATENT DOCUMENTS

| 3,519,179 | 7/1970 | Stephen | 224/326 |
| 4,175,682 | 11/1979 | Bott | 224/309 |
| 4,239,138 | 12/1980 | Kowalski | 224/325 |
| 4,901,902 | 2/1990 | Stapleton | 224/326 |

Primary Examiner—Linda J. Sholl
Attorney, Agent, or Firm—Dykema Gossett

[57] ABSTRACT

A roof rack comprises a pair of interconnected side rails overlying and at their ends connected to a vehicle roof, and elongated caps of a flexible material overlying and enclosing a portion of each rail and interlocked therewith. Each rail is an elongated extrusion including a pair of parallel top bends along its length with spaced strips depending from the beads defining undercut corners. Out-turned flanges extend from the strips and terminate in upturned marginal ledges. The cap has a top wall that overlies the beads and a pair of side walls terminating in a pair of opposed internal supports respectively overlying the out-turned flanges and retained and interposed between the strips and marginal ledges. A pair of opposed internal anchor flanges on the side walls interlockingly engage the shoulders to secure then cap along its length to the rail.

15 Claims, 2 Drawing Sheets

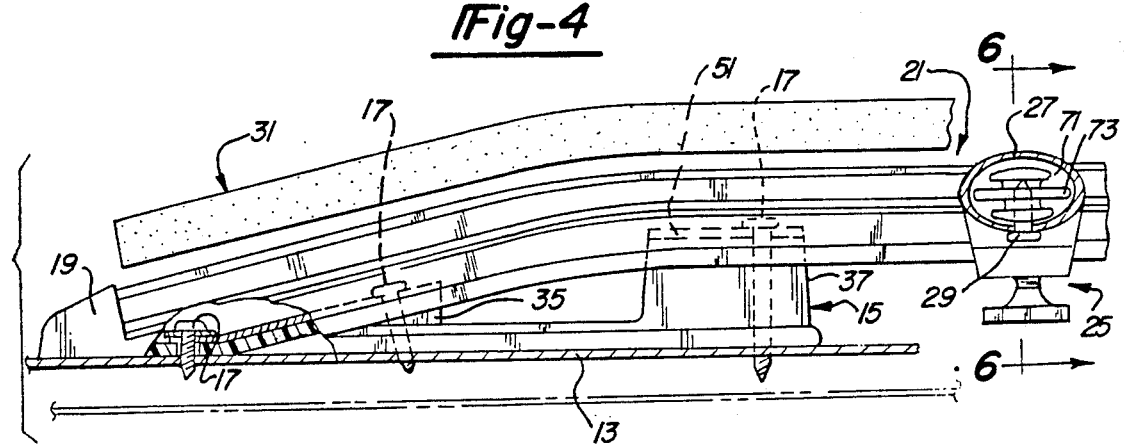
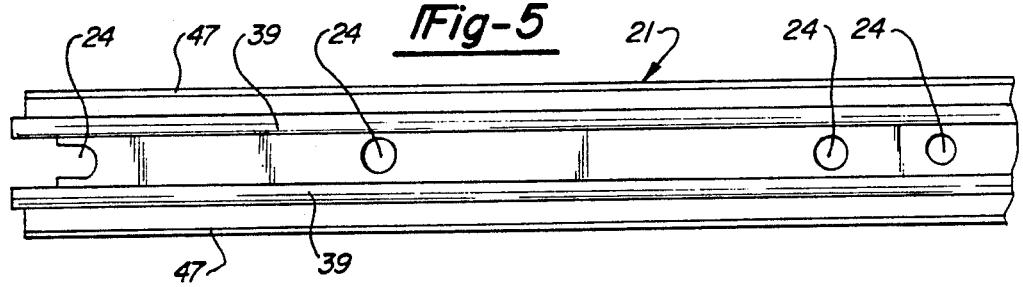
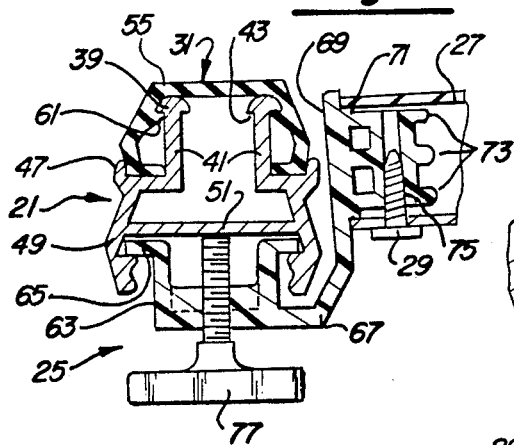
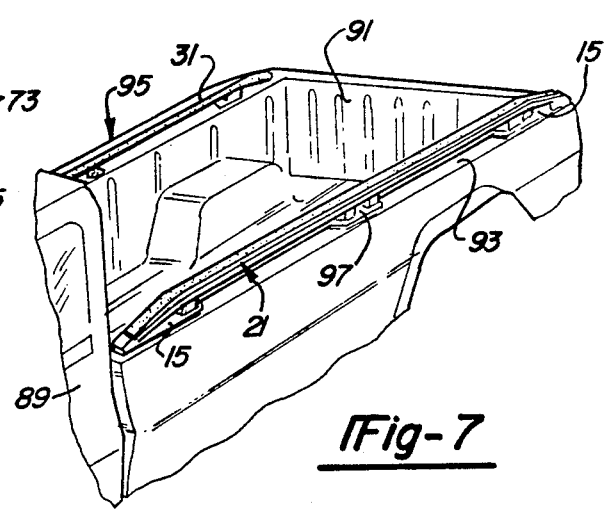

ROOF RACK FOR VEHICLES

TECHNICAL FIELD

This invention relates to roof racks for vehicles and more particularly to extruded side rails with overlying caps of a flexible material secured thereto.

BACKGROUND OF THE INVENTION

Previously roof racks for vehicles have been employed which essentially include the use of a pair of side rails, cross bars there-between and some means for anchoring the side rails to the vehicle roof. The difficulty has been to provide a useful and convenient means by which the side rails are anchored to the roof without damage to the roof, together with a means to anchor a flexible protective cap to overlie the side rails. Further problems have involved the provision of a resilient or flexible cap along and over the top of the rail over which objects carried upon the rack may be supportably mounted without damage to the roof. Further difficulties have existed in providing a proper means for anchoring the rails to the vehicle roof.

SUMMARY OF THE INVENTION

An important feature of the present invention is to provide an improved roof rack which includes a pair of innerconnected side rails which overlie and at their ends are connected to the vehicle roof and which includes an elongated cap of a flexible material overlying, enclosing a portion of each rail and interlocked therewith.

Another feature is to provide the roof rail as an extrusion, as for example an aluminum extrusion, which is of such construction as to facilitate the assembly and anchorage of an elongated resilient and flexible cap over and along the length of the side rail and fixedly secured thereto.

Another important feature is to provide a side rail for a roof rack which includes a pair of parallel spaced top beads along its length, spaced strips depending from the beads defining undercut shoulders and wherein out-turned flanges extend from the strips and terminate in upright marginal ledges.

As another feature there is provided an elongated cap of a flexible plastic material having a top wall that overlies the beads and includes a pair of side walls terminating in a pair of opposed inturned supports which respectively overlie the out-turned flanges and are retained and interposed between the strips and marginal ledges. A pair of opposed internal anchor flanges on the side walls of the cap interlockingly engage the shoulders to secure the cap along its length to the side rail.

As another feature, there is provided an improved means of supporting and anchoring the respective ends of the side rails. These include a pair of aligned end posts which overlie the roof top and are adapted to supportably receive and anchor end portions of each side rail.

As another feature, the respective end caps include a stop at one end, an inclined ramp intermeding its ends, and a support at its other end over which is positioned the down-turned or curved ends of the respective side rails. Fasteners are employed for anchoring the side rails to the end posts and the end posts to the vehicle roof. The protective plastic cap overlies and encloses the fasteners.

As another feature of the present invention, there is provided as a part of the extrusion, a pair of depending diverging and interconnected side walls including opposed internal tracks adapted to supportedly receive a cross bar connector. The connector depends from the bottom of the side rail and is adjustable along its length and is secured in an adjusted position thereon.

Another feature includes an improved bracket which extends from the cross bar connectors and is adapted to supportably mount and receive and anchor the respective ends of cross bars extending between the respective side rails of the rack.

These and other features and objects will be seen from the following specification and claims in conjunction with the appended drawings.

BRIEF DESCRIPTION OF THE DRAWINGS

FIG. 4 is a bracketed fragmentary side elevational view of the side rail of FIG. 1 and cap therefore.

FIG. 5 is a fragmentary plan view of the side rail shown in FIG. 4.

FIG. 6 is a section taken in the direction of arrows 6—6 of FIG. 4, on an increased scale with a cap assembled over the side rail and the cross bar connector for a cross bar fragmentarily shown.

FIG. 7 is a fragmentary perspective view of a pick-up truck with side rails thereon.

Figure 3:
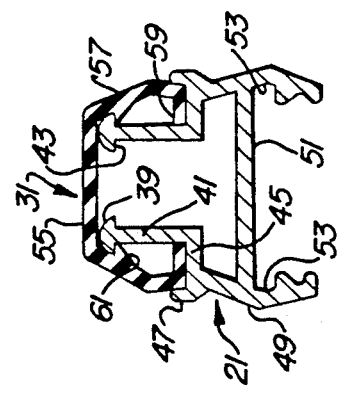
FIG. 3 is a section taken in the direction of arrows 3—3 of FIG. 1, on an increased scale.

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Referring to the drawings the present roof rack generally designated at 11 is mounted upon a vehicle roof 13, fragmentarily shown.

Figure 1:
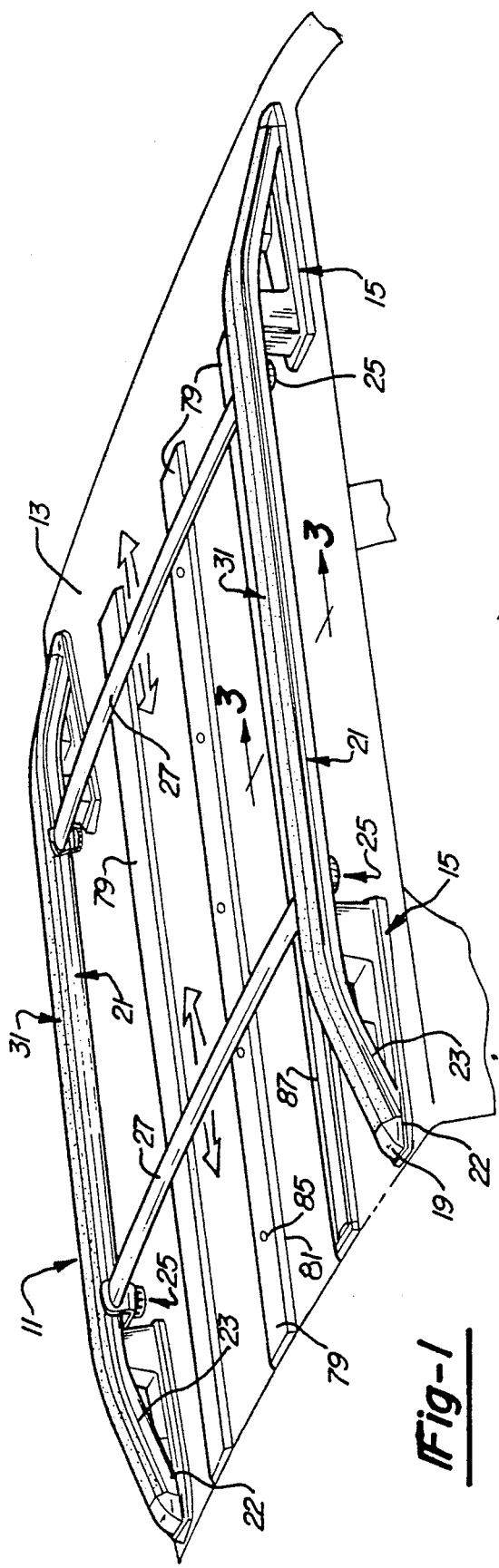
FIG. 1 is a top perspective view of a vehicle roof with the present roof rack secured thereto.
Figure 2:
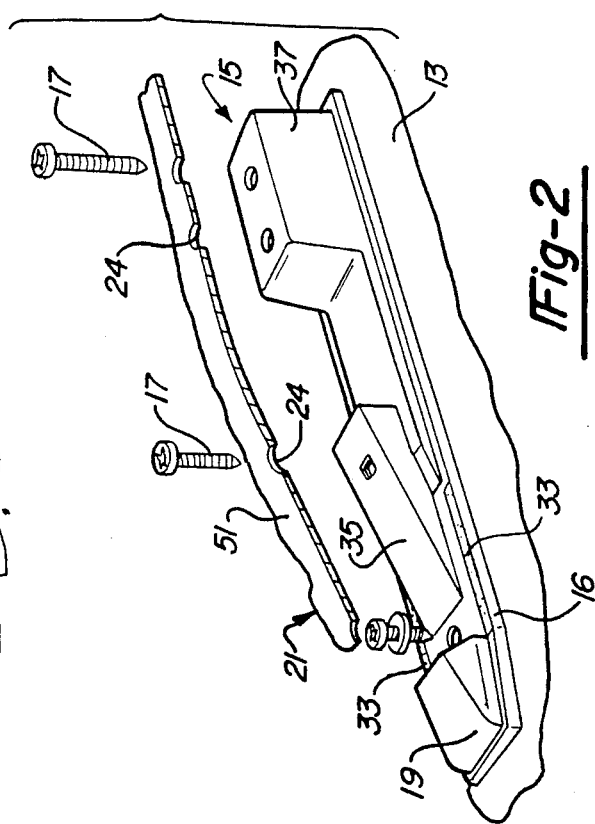
FIG. 2 is a front perspective view of one of the end posts in FIG. 1, on an increased scale.

The means of supporting and anchoring the roof rack 11 to the vehicle roof 13 includes for each of the laterally spaced side rails 21 of the rack, a pair of aligned oppositely extending end posts 15, FIGS. 1 and 2. These end posts are constructed by plastic material, such as polyvinyl chloride for illustration, sometimes referred to as a flexible plastic material. Each end post includes an elongated base 16 anchored to the roof by a plurality of fasteners 17.

The respective end posts each have a tapered stop 19 at one end adapted to receive the respective ends of each side rail. Each side rail extends longitudinally and at its ends has downwardly curved or inclined end portions 23 with flattened portions 22 on their under surfaces at the ends thereof adapted for registry with the surface of the base 16 of said end post while bearing against the corresponding stop 19, FIG. 1.

The respective ends of the side rails 21 have a series of longitudinally spaced apertures 24, FIGS. 2 and 5, to receive fasteners 17.

On the underside of each of the side rails 21 are adjustably mounted a pair of longitudely spaced cross bar connectors 25 constructed of a polyvinyl chloride or other flexible plastic, which are slidably mounted upon the respective rails, FIG. 6.

A pair of longitudinally spaced cross bars 27, FIG. 1, of general oval cross-section extend between side portions of the respective side rails and at their ends are connected to the cross bar connectors 25 in the manner shown in FIGS. 4 and 6.

The elongated cap 31 is of general inverted U-shape in cross-section, overlies and is snapped fastened to the side rails 21.

Each of the end posts 15 include opposed side flanges 33 adjacent the stop 19 adapted to cooperatively receive the flattened surfaces 22 of the end portions 23 of the respective rails restraining them against transverse movement relative to the base 16 of each end post.

Each of the end posts 15 include a ramp 35, FIG. 2, spaced from the stop 19 and apertured to receive fastener 17. Adjacent the other end of base 16 of said end post there is provided and apertured upright rail support 37 adapted to supportedly project into undersurface end portions of the respective side rail 21 supporting portions of the side rail away from the vehicle roof 13, as in FIG. 1.

In a preferred embodiment, the present side rail is in the form of an aluminum extrusion, for illustration, and includes a pair of elongated laterally spaced top beads 39, FIGS. 3 and 6, generally semi-circular in cross-section. Depending from the respective beads 39 are a pair of upright elongated continuous strips 41 which define with the beads 39 the pair of outer undercut shoulders 43.

The respective strips 41 terminate in the out-turned flanges 45. These in turn terminate in the upright marginal ledges 47.

Depending from the outer end portions of the respective flanges 45 are a pair of opposed diverging walls 49 interconnected by the transverse continuous web 51, having apertures 24, FIG. 5.

A pair of opposed inturned tracks 53 are formed upon the interior of the side walls 49, cooperate with the web 51 and are adapted to receive the out-turned mount flanges 65 of the cross bar connectors 25, FIG. 7.

The elongated cap 31 which overlies the upper portion of the side rail 21 throughout its length is constructed of a flexible plastic such as polyvinyl chloride, rubber or Neoprene or other flexible plastic material, is of inverted U-shape and of a molded construction, FIGS. 3 and 6.

Said cap includes a continuous top wall 55 which spans and overlies the respective beads 39 and includes a pair of downwardly inclined side walls 57, whose lower ends terminate in the inturned supports 59.

As shown in FIG. 3, the center distance between inturned supports 59 at their inner ends is less than the maximum spacing between the respective beads 39. Thus, the side walls 57 of the cap must be stressed outwardly or flexed resiliently in order that the cap may be assembled over the respective beads 39, FIG. 3. In that assembly inturned supports 59 are nested above and along the corresponding out-turned flanges 45 and interposed between the corresponding strips 41 and ledges 47 and retained there-between.

Cap 31 includes upon the interior of its side walls 57 a pair of internal opposed longitudinal anchor flanges 61 which are adapted to flex over the beads 39 and are interlockingly engaged under the shoulders 43 for anchorage to side rail 21, FIG. 6. This provides the means by which the elongated cap is assembled over and snapped fastened and resiliently interlocked and retainingly engaged upon the side rails 21 and secured thereto.

In installing the rack cap 31 the respective ends of the cap are first snapped over the curved ends 23 of the side rail 21 and the installation is completed by snapping the cap over said beads 39 at intermediate points along the length of the side rail.

Each cross bar connector 25 has a U-shaped base 63 of PVC terminating the out-turned mount flanges 65 adapted to slidably mount upon the opposed internal tracks 53 of the extrusion, FIG. 6.

Base 63 terminates in the side arm 67 having an upright support 69 which extends upon the interior of side rail 21 and is adapted for registry with the corresponding end of the oval-shaped cross bar 27 of FIG. 1, and fragmentarily shown in FIG. 6.

In the unique assembly of the cross bar connectors 25 upon the underside of the web 51 and below the respective side rails 21 for movement along their length, the support 69 terminates in the lateral oval shaped cross bar support 71 of a size and shape as to cooperatively receive the oval bore of the cross bar 27, FIG. 4.

Molded as a part of the support 71 are a plurality of vertically stacked lateral anchor flanges 73 which extend from top to bottom of the oval cross bar support 71 and have aligned apertures 75 therethrough.

In order to secure the respective cross bar 27 to and over the cross bar support 71 and lateral anchor flanges 73, there is employed a single fastener 29, FIG. 6. Said fastener extends up through a corresponding aperture in the underside of cross bar 27 and extends snugly through and interlockingly engages the corresponding apertures 75 of anchor flanges 73.

In normal operation the innterconnected side rails 21 are assembled over the vehicle roof 13, and the respective cross bar connectors 25 are adjusted inwardly of the adjacent end post 15 and are secured in position by the friction set screw 77, FIGS. 4 and 6. Said screw is threaded up through the base 63 of the cross bar connector and frictionally engages web 51.

THE ASSEMBLY AND MOUNTING OF THE ROOF RACK TO THE VEHICLE ROOF

After there has been assembled the cross bar connectors 25 to the respective side rails 21 and cross bars 27 into a unit assembly with the fasteners 29, FIGS. 4 and 6, the roof rack 11 is positioned over the vehicle roof along with a plurality of laterally spaced protective roof slats 79, FIG. 1. These are constructed of a flexible plastic material such as polyvinyl chloride.

Each of the roof slats has an adhesive layer 81 upon its under surface with a protective tear off strip, not shown. The slats 79 include upright opposed marginal flanges 87 and a series of longitudinally spaced apertures 85 by which the slats may be further anchored to the vehicle roof 13 with suitable screws.

As a part of the method of installation, the assembled roof rack and the respective roof slats are positioned loosely upon the roof in the desired position, such as shown in FIG. 1. The slats 79 are respectively spaced laterally, generally parallel, between the side rails 21. The user then marks the ends of each slat and the holes in the ends of the roof rack with a pencil or marker and at the same time a scribe is used for marking holes on the roof for the anchoring of the end posts 15 to the roof.

As a further step, the roof rack is then removed and the roof slats 79 are separately installed by removing the tape backing and carefully positioning the respective slats with the adhesive layer 81 on their undersurface by pressing down firmly. Great care is taken to properly position each slat before allowing it to contact the roof surface. At that time fasteners are used for further anchoring the roof slats to the roof. With the respective end posts 15 loosely assembled to underlie and support the respective curved ends 23 of the side rails, and with the cap 31 removed, holes are carefully drilled in the roof with a 7/64th inch diameter bit. Care must be taken to limit penetration of the drill bit to avoid damage to the headliner in the roof on its interior by placing a drill stop over the drill bit so that only ¼ inch of the bit extends beyond the drill bit.

With the roof rack and the end posts 15 assembled thereto, the roof rack 11 is carefully assembled over the vehicle roof and properly spaced and located with respect to the slats 79. Suitable fasteners 17 are employed extending through the web 51 and apertures 24, so as to extend through the respective end post apertures and corresponding apertures 24 in the side rails so as to simultaneously anchor the respective end posts to the vehicle roof and anchor the corresponding ends of the side rails to the end posts and to the roof.

After this has been completed, the rack caps 55 are reinstalled over the top edges of the side rails. This is done by first snapping the ends of the cap over the curved ends 23 of the rail, then completing the installation by snapping the cap down completely.

The foregoing description is for the purpose of enabling the user to properly employ the present embodiment and to effectively use it as intended as a part of a roof rack and its assembly with respect to a vehicle roof.

MODIFICATION

The present side rails 21 of the same construction are shown as side rail assemblies 95, FIG. 7. The pair of said side rail assemblies 95 are mounted upon the top of side walls 93 of box 91 of the illustrative pick-up truck 89, fragmentarily shown.

The mounting and construction of the side rail 21 are the same as shown in FIGS. 1-6. Re-enforcing spacers 97 are mounted upon the top of the side wall 93 intermediate the end posts 15 and secured by fasteners similar to fastener 17, FIG. 2.

Having described my invention, reference should now be had to the following claims.

I claim:

1. Roof rack comprising a pair of parallel spaced interconnected side rails overlying a vehicle roof and at their ends secured thereto;
   an elongated cap of an inverted U shape constructed of a flexible plastic material overlying and enclosing a portion of each side rail along its length and interlocked therewith;
   said side rail being an elongated extrusion including a pair of parallel spaced top beads along its length;
   parallel spaced upright strips depending from said beads, defining a pair of continuous undercut shoulders;
   out-turned continuous flanges extending from said strips, respectively;
   upright continuous marginal ledges at the outer ends of said flanges;
   said cap including a top wall spanning and overlying said beads;
   a pair of side walls terminating in a pair of opposed in-turned supports respectively overlying said out-turned flanges and retainingly interposed between each upright strip and adjacent marginal ledge; and
   a pair of opposed internal longitudinal anchor flanges upon said side walls, yieldably and interlockingly engaging said shoulders respectively, for securing said cap along the length of said rail.

2. In the roof rack of claim 1, further comprising said cap side walls being normally biased towards each other and upon assembly over said rail outwardly stressed for a resilient interlock of said anchor flanges with said shoulders, when released.

3. In the roof rack of claim 2, further comprising said in-turned supports being retainingly nested and interlocked between said strips and ledges respectively.

4. In the roof rack of claim 1, each of said rails having end portions inclined downwardly;
   the securing of each rail to said roof including a pair of longitudinally spaced aligned end posts;
   each end post including a base mounted upon said roof;
   a stop on one end of said base receiving one end of said rail;
   a ramp on said base spaced from said stop engaging an inclined portion of said rail;
   a support upon said base at its other end extending into and supporting said rail; and
   a plurality of fasteners extending through said rail at its ends and through said base, ramp and support of said end posts and through corresponding apertures in said roof retainingly engaging said roof, for anchoring said end posts to said roof and for securing said rails to said end posts.

5. In the roof rack of claim 1, further comprising said flexible material being elected from a group consisting of flexible Polyvinyl Chloride (PVC), rubber and Neoprene.

6. In the roof rack of claim 1, further comprising said extrusion being of an aluminum material.

7. In the roof rack of claim 1, further comprising the inner ends of the inturned supports of said cap having a center distance less than the maximum spacing of said beads, to provide a snap interlock above said out-turned flanges and between said strips and ledges.

8. In the roof rack of claim 4, further comprising marginal flanges on the base of each end post adjacent its stop, the end portions of each rail bearing upon the corresponding end post and laterally retained between said marginal flanges.

9. In the roof rack of claim 1, further comprising a pair of longitudinally spaced cross bars interposed between and at their ends adjustably secured to said rails.

10. In the roof rack of claim 1, further comprising said side rails including a pair of interconnected side walls depending from said out-turned flanges;
    a pair of opposed internal tracks within said side walls;
    a pair of longitudinally spaced cross bar connectors having out-turned mount flanges slidably supported upon said tracks and depending therefrom;
    an L shaped bracket on each cross bar connector; and
    a pair of longitudinally spaced cross bars interposed between and at their ends secured respectively to corresponding connector brackets.

11. In the roof rack of claim 10, further comprising a set screw threaded up through each cross bar connector and frictionally engaging said rail for securing said cross bar connector to said rail against relative longitudinal movement.

12. In the roof rack of claim 10, further comprising an oval shaped boss upon said bracket;
- a plurality of parallel spaced apertured flanges extending from said boss having an oval configuration;
- said cross bars being of oval shape and at each end supported over said bosses and apertured flanges; and
- a fastener extending up through the cross bar and through said flanges.

13. A side rail for a roof rack overlying a vehicle roof and at its ends secured thereto, and an elongated cap of inverted U shape constructed of a flexible plastic material overlying and enclosing a portion of said side rail along its length and interlocked therewith;
- said side rail being an elongated extrusion including a pair of parallel spaced top beads along its length;
- parallel spaced strips depending from said beads, defining a pair of continuous undercut shoulders;
- out-turned continuous flanges extending from said strips respectively;
- upright continuous marginal ledges at the outer ends of said flanges;
- said cap, including a top wall spanning and overlying said beads;
- a pair of side walls terminating in a pair of opposed in-turned supports respectively overlying said out-turned flanges and retainingly interposed between each upright strip and adjacent marginal ledge; and
- a pair of opposed internal longitudinal anchor flanges upon said side walls, yieldably and interlockingly engaging said shoulders respectively, for securing said cap along the length of said rail.

14. In combination, a side rail;
- an elongated cap of an inverted U shape constructed of a flexible plastic material overlying and enclosing a portion of said side rail along its length and interlocked therewith;
- said side rail being an elongated extrusion including a pair of parallel spaced top beads along its length;
- parallel spaced upright strips depending from said beads, defining a pair of continuous undercut shoulders;
- out-turned continuous flanges extending from said strips, respectively;
- upright continuous marginal ledges at the outer ends of said flanges;
- said cap including a top wall spanning and overlying said beads;
- a pair of side walls terminating in a pair of opposed in-turned supports respectively overlying said out-turned flanges and retainingly interposed between each upright strip and adjacent marginal ledge; and
- a pair of opposed internal longitudinal anchor flanges upon said side walls, yieldably and interlockingly engaging said shoulders respectively, for securing said cap along the length of said rail.

15. In combination with the top of each side wall of the box of a pick-up truck, an elongated side rail overlying said top and at its ends secured thereto;
- an elongated cap of inverted U shape constructed of a flexible plastic material overlying and enclosing a portion of said side rail along its length and interlocked therewith;
- said side rail being an elongated extrusion including a pair of parallel spaced top beads along its length;
- parallel spaced strips depending from said beads, defining a pair of continuous undercut shoulders;
- out-turned continuous flanges extending from said strips respectively;
- upright continuous marginal ledges at the outer ends of said flanges;
- said cap, including a top wall spanning and overlying said beads;
- a pair of side walls terminating in a pair of opposed in-turned supports respectively overlying said out-turned flanges and retainingly interposed between each upright strip and adjacent marginal ledge; and
- a pair of opposed internal longitudinal anchor flanges upon said side walls, yieldably and interlockingly engaging said shoulders respectively, for securing said cap along the length of said rail.

* * * * *